March 12, 1957     W. JENKINS ET AL     2,784,827
COIN OPERATED MECHANISM FOR VENDING MACHINES
Filed Nov. 20, 1953     4 Sheets-Sheet 1

INVENTOR.
WALLACE JENKINS
HUGH L. McCREERY
BY
ATTORNEY

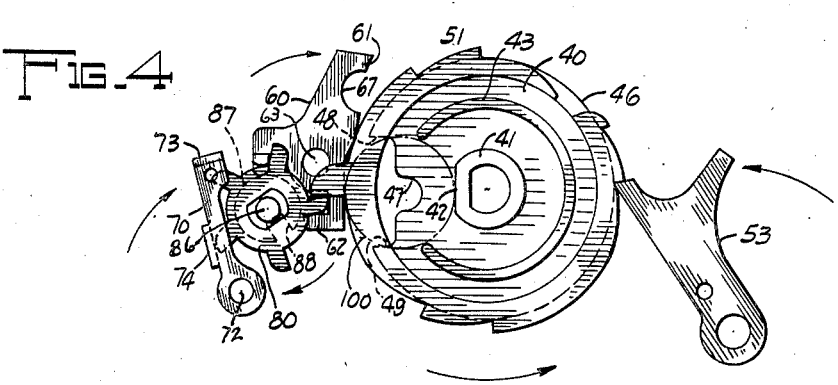
Fig. 4
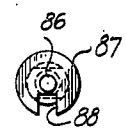
Fig. 7
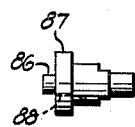
Fig. 5
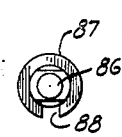
Fig. 6
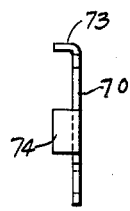
Fig. 9
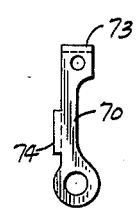
Fig. 8
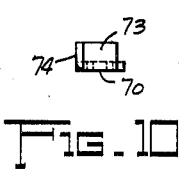
Fig. 10
Fig. 12
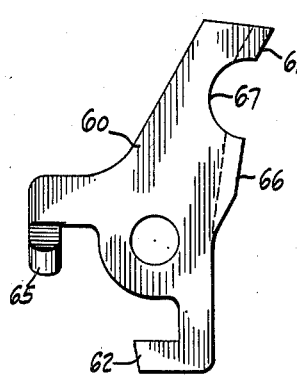
Fig. 11
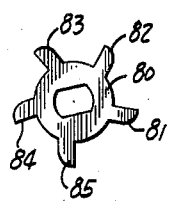
Fig. 13
Fig. 14
INVENTOR.
WALLACE JENKINS
BY HUGH L. McCREERY
ATTORNEY March 12, 1957 W. JENKINS ET AL 2,784,827
COIN OPERATED MECHANISM FOR VENDING MACHINES
Filed Nov. 20, 1953 4 Sheets-Sheet 3

INVENTOR.
WALLACE JENKIN
BY HUGH L. McCREERY

Sanford Schnurmacher
ATTORNEY

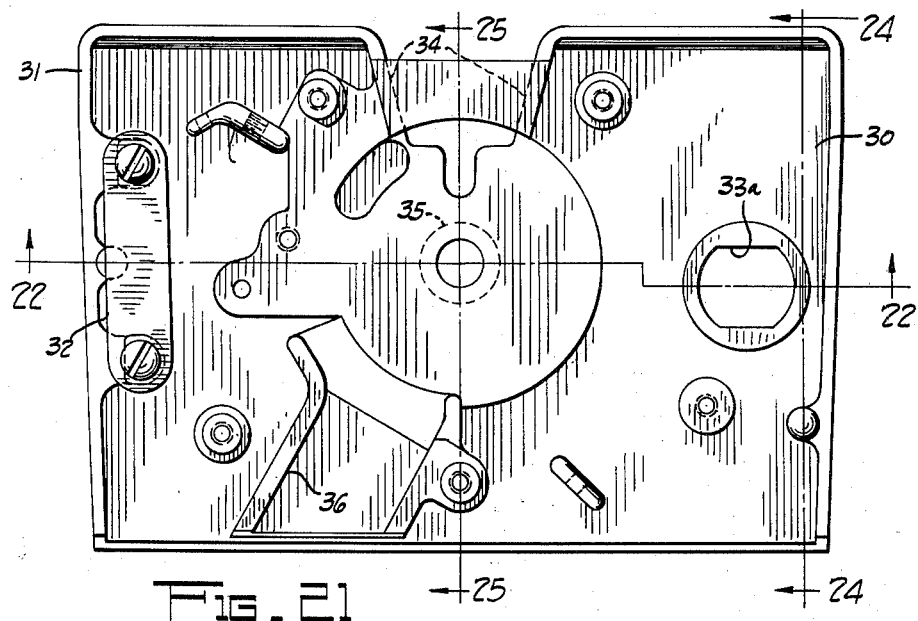
Fig. 21
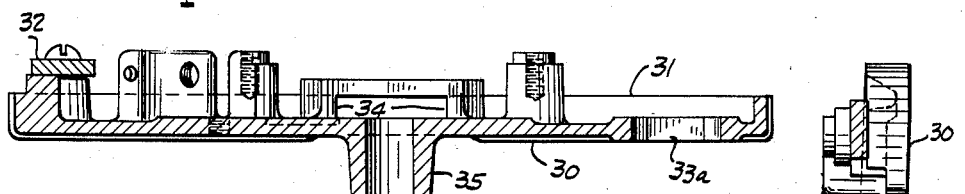
Fig. 22
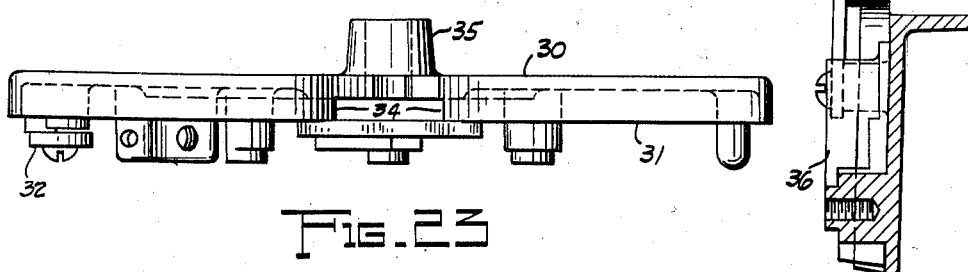
Fig. 23
Fig. 25
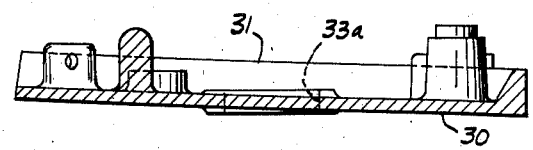
Fig. 24
INVENTOR.
WALLACE JENKINS
BY HUGH L. McCREERY
ATTORNEY

United States Patent Office 2,784,827
Patented Mar. 12, 1957

2,784,827

COIN OPERATED MECHANISM FOR VENDING MACHINES

Wallace Jenkins, Lakewood, and Hugh L. McCreery, North Royalton, Ohio, assignors to The Atlas Manufacturing & Sales Corporation, Cleveland, Ohio, a corporation of Ohio Application November 20, 1953, Serial No. 393,394

1 Claim. (Cl. 194—61)

This invention relates to improvements in vending machines and particularly to the coin operated dispensing mechanism thereof.

The primary object of this invention is to provide an actuator for a vending machine that will accept a coin of either small or large diameter and activate the dispensing means thereof to deliver one cycle for a small coin or a plurality of cycles for a coin of larger diameter.

A further object is to provide an improved means for preventing the actuation of the dispensing means when no coin or an improper object is inserted therein.

A further object is to provide an improved machine of this character which will be comparatively simple and compact in construction and effective and efficient in operation.

These and other objects of the invention will become apparent from a reading of the following specification and claim, together with the accompanying drawings, in which like parts are referred to and indicated by like reference characters, and wherein:

Figure 4 is a view similar to that of the Figure 3, but showing the actuator finger engaged with the first metering element tooth at the end of the first 90° of its rotation;

Figure 5 is a front view of the ratchet shaft;

Figure 6 is a right end view of the same;

Figure 7 is a left end view of the same;

Figure 8 is a front elevation of the ratchet;

Figure 9 is a left end view of the same;

Figure 10 is a bottom view of the same;

Figure 11 is a front view of the coin cam;

Figure 12 is a left end view of the same;

Figure 13 is a front view of the ratchet wheel;

Figure 14 is a right end view of the same;

Figure 21 is a rear elevation of the base plate as it appears without the coin mechanism mounted thereon;

Figure 22 is a horizontal cross sectional view taken along the line and in the direction of the arrows 22—22 of the Figure 21;

Figure 23 is a top plan view of the base illustrated in the Figure 21;

Figure 24 is a vertical sectional view taken along the line and in the direction of the arrows 24—24 of the Figure 21; and Figure 25 is a vertical sectional view taken along the line and in the direction of the arrows 25—25 of the Figure 21.

Figure 1:
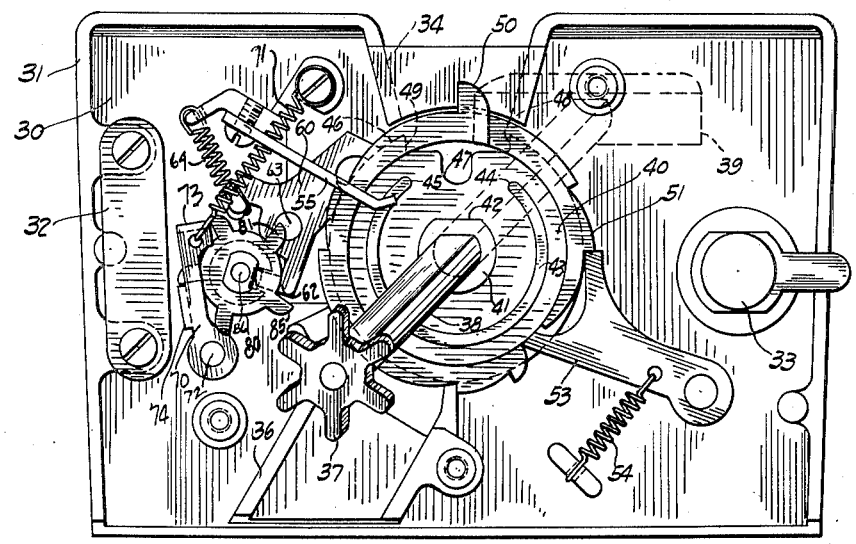
Figure 1 is a rear view, with parts omitted, of a mechanism of this character constructed in accordance with the principles of this invention and showing the parts in their normal position.

Referring more particularly to Figure 1, there is seen the mechanism that is the subject of this invention as it appears mounted upon a base or front plate 30 of a coin operated vending machine of the usual type, not illustrated. The coin control mechanism is connected to the dispensing mechanism of a conventional vending machine through a shaft 38 and a star wheel 37 which meshes with the merchandise delivery wheel of the dispensing mechanism in a manner well known to those skilled in the art. Since the dispensing mechanism is not the subject of this invention, its construction is not illustrated or discussed herein, but it is to be understood that any type dispensing mechanism that is operable by means of a rotating shaft may be controlled and operated by our device. The several parts of the device constituting this invention are mounted on the inside face of a rigid plate or wall that forms a part of the vending machine housing. In the preferred form illustrated in Figure 1 and Figures 21 to 25 inclusive, the plate or base 30 has a grooved edge 31, hinge portion 32, coin notch 34 and lock 33, mounted in hole 33a, and is intended to fit into the front wall of a vending machine housing of the type illustrated in our co-pending United States patent application, Serial No. 393,454, filed November 20, 1953, entitled, "Vending Machine Housing."

An operating shaft 38 is journaled in the bearing 35 of base 30 immediately below and in line with the coin notch 34. This shaft has a handle 39 positioned on the end thereof on the outside face of the base, where it may be grasped and turned by the customer. A star wheel 37 is secured to the opposite end of shaft 38 within the housing and is in meshed engagement with the merchandise dispensing mechanism of the vending machine. Reference numeral 40 indicates a coin gear mounted on shaft 38 on the inside or rear face of the base plate 30. This gear has a smooth peripheral rim 46 that is interrupted at a notched out portion 47 to form abutment edges 48 and 49. The notch 47 is shaped to match the notch 34 of the base 30 when the gear is in its normal, inoperative position, illustrated in Figure 1. A toothed edge 51 is positioned on the gear inwardly of the smooth rim 46 for a purpose to be hereinafter disclosed. A radially extending activating finger 50 is positioned on the gear 40 inwardly of the toothed edge 51 and is engageable with the teeth of the ratchet or metering gear 80, described hereinafter.

A circular track 43 is positioned on the inner face of the gear 40, inwardly of the rim 46 with the shaft 38 as its center. Track 43 is interrupted at points 44 and 45 which are spaced apart a distance such that the largest coin which the device is capable of accepting will nest between the track ends 44 and 45 when the coin is resting on the flat 42 of the coin gear bushing 41.

Reference numeral 60 indicates a coin cam pivotally mounted on shaft 63. The coin cam has a foot 61 that rides on the coin gear rim 46 and a key or hook portion 62 that is engageable with the metering gear shaft cam surface 87. Reference numeral 66 indicates a camming surface positioned between the foot and the key, as is seen most clearly in Figures 11 and 12. A spring 64 is attached to the stud 65 of the coin cam 60 to constantly bias the foot and key against the coin and metering gears, respectively, as described hereinafter.

A metering gear shaft 86 is journaled on the base plate 30 as seen in Figure 1. The shaft 86 has a camming surface 87 interrupted by a slot 88. The metering gear 80 is mounted on the inner end of the shaft 86. The metering gear 80 illustrated has five teeth identified by reference numerals 81, 82, 83, 84 and 85 respectively. All of the teeth are not spaced equi-distant. The first tooth 81, corresponding to the first metered dispensing cycle, is positioned 82° from the last or fifth tooth 85 which meters the last cycle. The remainder of the teeth, that is those controlling the second, third and fourth cycles, corresponding to teeth identified as 82, 83 and 84 are spaced 69° 30' apart.

A ratchet 70 associated with the teeth of the metering gear 80 is pivotally mounted on stud 72 and is biased by spring 71 to press its foot 73 against the teeth of the metering gear 80.

When no coin is in the coin gear seat formed by the ends 44 and 45 of the track 43 and the flat 42 of the bushing 41, the foot 61 of the coin cam 60 rests against the rim 46, as seen in Figure 1.

It will be noted that there is a semi-circular notch 67 cut out of the coin cam face immediately adjacent its foot portion 61. As the coin gear 40 is turned counter-clockwise, as we look at the drawings, by the handle 39, the abutment 49 is brought under the coin cam notch 67. The upward pull of the spring 64 causes the cam 60 to tilt downward bringing its foot 61 below the surface of the rim 46 and into engagement with the abutment 48 which locks the coin gear against further rotation in a counter-clockwise direction.

Reversal of the coin gear 40 is prevented by the engagement of its teeth 51 with the pawl 53 which is constantly pressed toward the teeth by spring 54. The teeth 51 are so shaped that when turned in a counter-clockwise, or forward direction, the pawl 53 will override them. Thus unauthorized operation of the device is prevented, when no coin is nested in the coin gear seat.

Reference numeral 55 indicates a washer dog having an end which is spring pressed against the upper face of track 43. This dog is carried over the space between the ends 44 and 45 of the track 43 by a proper coin seated therebetween. If no coin is present, it will engage the end 44 of the track to impede further rotation of coin gear 40. If a washer, or like object, is inserted instead of a proper coin, the dog will extend through the hole thereof to lock the gear against further rotation.

Figure 2:
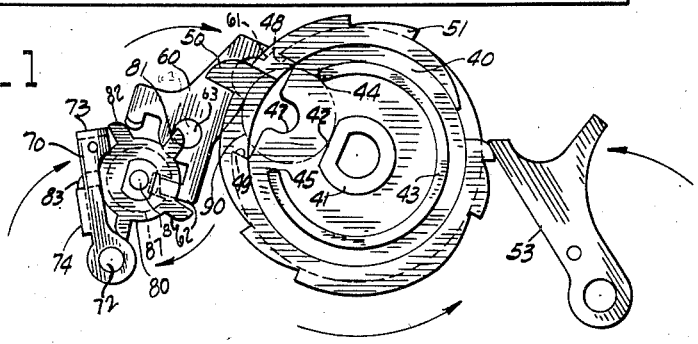
Figure 2 is a schematic view of the device showing the parts positioned as they appear when a coin of small diameter is nested in the coin carrier during the first 45° of its rotation.

The operation of the device with a small coin 90, such as a penny, is illustrated in Figure 2. It will be seen that the penny 90 is seated on the coin gear 40 between the ends of the track 43 on top of the flat 42 of the bushing 41. The coin thus becomes in effect a part of the coin gear 40 and moves therewith as the gear is rotated in a counter-clockwise direction. The flat 42 is so positioned that the top edge of a small coin, or penny, so held, will extend slightly above the projected surface of the rim 46 between its abutments 48 and 49. As the gear and penny are rotated, the upper edge of the penny 90 will engage the camming surface 66 of coin cam 60 and tilt the cam upward a sufficient distance to enable its foot 61 to clear the abutment 48 of the gear 40, as rotation continues. The coin cam 60 now rides upon the penny 90 instead of on the rim 46. Furthermore, it will be noted that the tilting of cam 60 is not sufficient to disengage its key portion 62 from its seat in the metering gear shaft slot 88, so that the metering gear 80 is held immoveable. It will also be noted that the first tooth 81 of the metering gear 80 is positioned outside the path of the activating finger 50 of the coin gear 40. Therefore, the finger 50 will pass the metering gear without engaging it, as rotation of the coin gear 40 continues. After the coin gear has been rotated approximately 150°, the coin 90 will fall out of its seat on the gear 40 and into the coin receptacle of the machine through a channel 36 attached to the base plate 30, as seen in Figure 1. The gear 40 is now free to rotate the balance of its cycle and return to its original position. The rotation of the shaft 38, which occurs at the same time, causes the star gear 37 to activate the merchandise dispensing mechanism in the usual manner. If a second cycle is attempted without inserting another coin, the coin cam foot 61 which was returned into contact with the gear rim 46 as soon as the penny passed it, will engage the abutment 48 and stop further rotation of the handle 39 and shaft 38.

Figure 3:
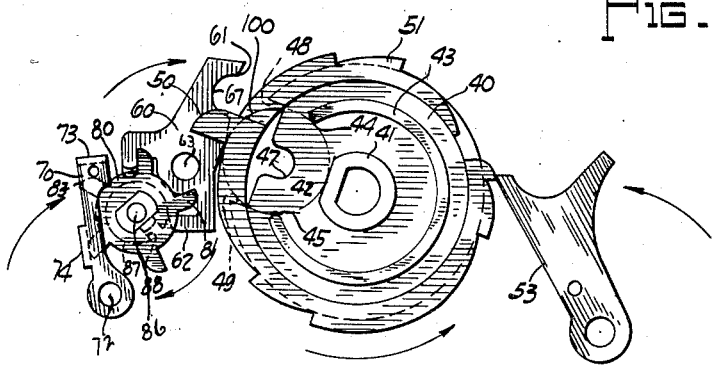
Figure 3 is a schematic view of the device showing the parts positioned as they appear when a coin of large diameter is nested in the coin carrier during the first 45° of its rotation.
Figure 16:
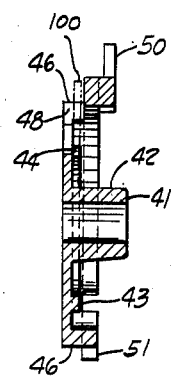
Figure 16 is a vertical sectional view taken along the line and in the direction of the arrows 16—16 of the Figure 15.
Figure 15:
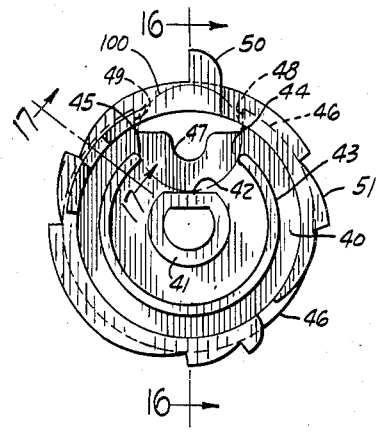
Figure 15 is a rear view of the coin gear showing a large diameter coin nested therein.
Figure 17:
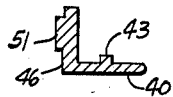
Figure 17 is a cross sectional view of the coin gear taken along the line and in the direction of the arrows 17—17 of the Figure 15.
Figure 18:
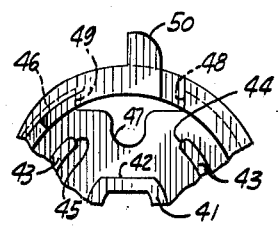
Figure 18 is a rear view of a portion of the coin gear showing the actuating finger and coin slot.
Figure 19:
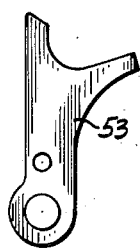
Figure 19 is a front elevation of the reverse locking pawl.
Figure 20:
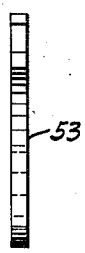
Figure 20 is a right end view of the same.

The operation of the device with a large coin such as a nickel 100 is illustrated in Figures 3 and 4. After insertion of the coin, the handle 39 is rotated in the same manner as before. Being of larger diameter, the nickel 100 extends farther above the projected surface of the rim 46 than did the penny. Upon contact with the coin edge, the coin cam 60 will be tilted to such a degree that its key 62 will be moved out of engagement with the slot 88 of the metering gear shaft 86, as seen in Figure 3. At the same time, the foot 61 of the cam 60 is tilted clear of the abutment 48 of the coin gear 40. The release of the metering gear 80 by the removal of the key 62 from engagement therewith causes the foot 73 of the spring loaded ratchet 70 to rotate the metering gear 80 by bearing against tooth 82 to bring its first tooth 81 into the path of the coin gear finger 50, as is again seen in Figure 3. The further rotation of gear 40 brings the finger 50 into contact with metering gear tooth 81, to rotate the metering gear 1/5 of a turn to bring the second tooth 82 into the path of the finger 50 during its second cycle. Once the coin 100 has passed the camming surface 66 of the cam 60, the key 62 is supported on the camming surface 87 of the metering gear shaft 86 which has rotated with the gear 80 to move its slot 88 out of line with the key 62, as seen in Figure 4. Upon further rotation of the gear 40, the coin 100 leaves the gear through the channel 36 and passes into the coin receptacle therebeneath, and the merchandise vending mechanism is operated by the turning shaft 38. The coin gear 40, now without a coin therein, may be rotated a second, third, fourth and fifth time to actuate a like number of dispensing cycles in the vending mechanism. This is so because the coin cam key now rides on the metering gear cam surface 87, thereby keeping the coin cam 60 tilted and out of the way of the abutment 48 of the coin gear rim 46. As the cam gear finger 50 passes the metering gear teeth, it engages each tooth 82, 83, 84 and 85 in succession to rotate the metering gear shaft 86 1/5 of a turn at each engagement. After the fifth cycle, the slot 88 returns to alignment with the coin cam key 62 which drops therein to return the coin cam foot 61 to its original engagement with the coin gear rim 46. Any attempt to obtain a sixth cycle without depositing another coin is stopped by the engagement of the foot 61 with the abutment 48 of the coin gear 40.

The number of teeth on the metering gear 80 may be changed to provide a different ratio in cycles between coins of two different sizes. The only precaution to be observed being to maintain a great enough angle between the teeth controlling the first and last cycle to normally position the first tooth outside of the path of the finger 50 until conditions are intentionally set up to move it into said path as described hereinabove.

While the function of the device has been illustrated with pennies and nickels, it is to be understood that our device may be adapted to be used with any type of coins or tokens having the appropriate difference in diameter and value.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

We claim:

Coin operated means for controlling the dispensing mechanism of vending machines, comprising in combination, a revolving metering gear having a plurality of radially and outwardly extending teeth corresponding in number to the maximum number of dispensing cycles to be metered, the distance between the first and last of said teeth being greater than the distance between the intervening teeth which are equidistantly spaced, the said gear being mounted on a shaft, including a slotted camming surface; an actuator for said metering gear, including a rotatable coin carrier, connected to said dispensing mechanism, having a coin seat adapted to hold either a small or a large coin, said actuator also having an abutment at said seat and an outwardly extending activating finger, engageable with the teeth of said metering gear; the first tooth of said metering gear, corresponding to the first metered dispensing cycle, being normally outside of the path of said finger; a pivotally mounted locking cam having a key portion at one end thereof, normally engaged with said metering gear shaft cam slot, and a foot portion at the other end thereof normally engageable with said actuator abutment to restrain both the shaft and actuator from rotation, said locking cam being tiltable to a second or third position when its camming face is contacted by a coin of small or large diameter, respectively, nested in said carrier seat; in its second position said cam key portion being in locked engagement with said metering gear shaft cam slot, with its foot portion clear of the actuator abutment to release same for one dispensing cycle; in its third position, said cam key portion being clear of said metering gear shaft cam slot and said foot portion being clear of the actuator abutment to release both the metering gear shaft and the actuator; spring loaded means engageable with the first metering gear tooth for rotating the released metering gear shaft camming surface beneath the locking cam key and rotating the metering gear first tooth into the path of the actuator finger, when the locking cam is in its third position, to enable the finger to engage the metering gear teeth successively upon each revolution of the actuator during each dispensing cycle; the locking cam being supported in its third position all during the metered period by reason of the engagement of its key portion with the surface of the metering gear shaft cam; and spring loaded means for returning the cam key into locked engagement with the metering gear shaft cam slot and re-positioning the first metering tooth outside the path of the actuator finger at the completion of each 360° revolution of the metering gear and shaft.

References Cited in the file of this patent
UNITED STATES PATENTS 1,464,682    Norris _____ Aug. 14, 1923